United States Patent
Kamijo et al.

(10) Patent No.: US 9,555,749 B2
(45) Date of Patent: Jan. 31, 2017

(54) WIRE HARNESS

(71) Applicant: Sumitomo Wiring Systems, Ltd, Suzuka (JP)

(72) Inventors: Kuniaki Kamijo, Mei (JP); Morichika Yamamoto, Mie (JP)

(73) Assignee: Sumitomo Wiring Systems, Ltd., Suzuka (JP)

( * ) Notice: Subject to any disclaimer, the term of this patent is extended or adjusted under 35 U.S.C. 154(b) by 0 days.

(21) Appl. No.: 15/014,181

(22) Filed: Feb. 3, 2016

(65) Prior Publication Data
US 2016/0236631 A1 Aug. 18, 2016

(30) Foreign Application Priority Data
Feb. 16, 2015 (JP) .................................. 2015-027665

(51) Int. Cl.
*H01B 7/00* (2006.01)
*B60R 16/02* (2006.01)
(Continued)

(52) U.S. Cl.
CPC .......... *B60R 16/0215* (2013.01); *C09J 7/0264* (2013.01); *H01B 13/01263* (2013.01);
(Continued)

(58) Field of Classification Search
CPC .............. B29C 44/5627; B29C 59/022; B60R 16/0215; B60R 16/02; B60R 16/207; B60R 16/0222; B65D 63/10; C09J 7/02; C09J 7/0275; C09J 2203/302; C09J 2423/006; C09J 7/0289; C09J 2201/16; C09J 2201/606; H01B 7/00; H01B 7/0045; H01B 7/2825; H01B 7/25; H01B 7/17; H01B 17/60; H01B 17/66; H01B 7/189; H01B 11/002; H01B 13/01263; H01F 27/323; H02G 1/06; H02G 3/04; H02G 11/00; F16B 2/08; F16F 15/02; Y10S 174/26; Y10S 174/25; Y10S 428/92; Y10S 428/913; Y10T 428/2936; Y10T 428/2848; Y10T 428/24322; Y10T 428/24999; Y10T 428/2826; Y10T 428/31678; B60N 2/067; B60N 2/002; B60N 2/0232; B60N 2/0722; E04B 1/94; F01N 13/14; F16L 59/027
(Continued)

(56) References Cited

U.S. PATENT DOCUMENTS 463,107 A * 11/1891 Degenhardt ......... H01B 11/002
174/25 R
3,025,340 A * 3/1962 Olson .................... H01B 7/189
156/53
(Continued)

FOREIGN PATENT DOCUMENTS

JP 2008-120415 A 5/2008
JP 2010-126648 A 6/2010
(Continued)

*Primary Examiner* — Timothy Thompson
*Assistant Examiner* — Guillermo Egoavil
(74) *Attorney, Agent, or Firm* — Dinsmore & Shohl LLP (57) ABSTRACT

A wire harness configured to protect the group of lead wires having a large curve such that there is no risk of the binding tape-type protection portion exposing the group of lead wires is provided. The wire harness includes a group of lead wires and a binding tape-type protection portion that covers the group of lead wires. The binding tape-type protection portion is formed by overlapping a binding tape member around the group of lead wires. The binding tape member includes a tape member body that is made of a synthetic resin and is molded such that the cross-sectional shape (Continued)

orthogonal to the lengthwise direction is a four-triangle wave shape, and an adhesive layer formed on one surface of the tape member body.

7 Claims, 6 Drawing Sheets

(51) Int. Cl.
*H01B 13/012* (2006.01)
*C09J 7/02* (2006.01)

(52) U.S. Cl.
CPC ...... *C09J 2201/16* (2013.01); *C09J 2201/606* (2013.01); *C09J 2203/302* (2013.01)

(58) Field of Classification Search
USPC ........... 156/56, 53; 174/68.3, 72 A, DIG. 25, 174/DIG. 26, 120 R, 350; 336/206; 428/377, 78, 137, 349, 428, 450, 454, 428/457, 913, 920; 180/271; 256/62; 281/735
See application file for complete search history.

(56) References Cited

U.S. PATENT DOCUMENTS

2015/0184573 A1* 7/2015 Sim .................. B32B 15/01
  428/593
2016/0240282 A1* 8/2016 Yamamoto ........... H01B 7/2825

FOREIGN PATENT DOCUMENTS

| JP | 2010126648 A | * | 6/2010 |
| JP | 2012-227977 A | | 11/2012 |

* cited by examiner

Prior Art

Fig. 5B

Prior Art

Fig. 6

Prior Art

＃ WIRE HARNESS

CROSS-REFERENCE TO RELATED APPLICATIONS

This application claims priority to Japanese Patent Application No. JP2015-027665 filed Feb. 16, 2015.

FIELD OF THE INVENTION

The present invention relates to a wire harness for protecting a group of lead wires using a binding tape member.

BACKGROUND OF THE INVENTION

Figure 5A:
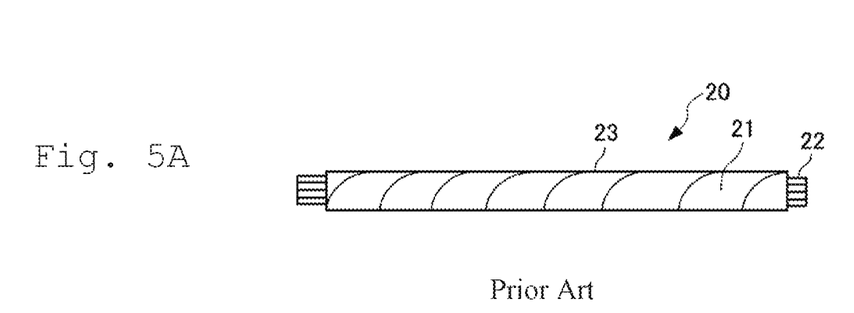
FIG. 5A is a front view of a conventional wire harness in a state of being routed in a straight line.

FIG. 5A is an illustrative view of a conventional a wire harness 20 having a binding tape member 21 having a flat band-shaped tape body, which is made of vinyl chloride, and an adhesive layer provided on the inner surface of the tape body, and the binding tape member 21 is used to form a binding tape-type protection portion 23 that is half-overlap wrapped around a group of lead wires 22, thus protecting the group of lead wires 22.

Figure 6:
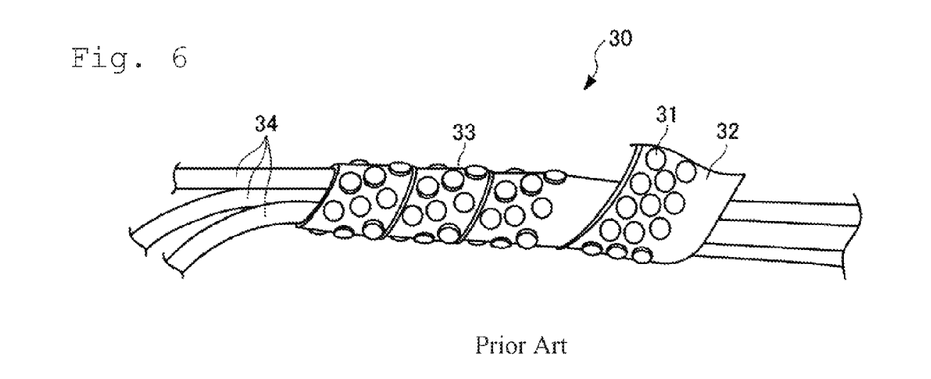
FIG. 6 is a front view of a wire harness according to a conventional example.

Furthermore, it has been proposed to use, in a wire harness 30 shown in FIG. 6, a binding tape member 32 constituted by a tape body having protrusions and recessions 31 formed by embossing, and double-sided adhesive tape provided on the inner surface side of the tape body (see JP 2008-120415A). In the case where a burr or edge is located along the wiring path for the wire harness 30, a group of lead wires 34 can be better protected if a binding tape-type protection portion 33 that is formed by the binding tape member 32 and has cushioning ability interferes with the burr or edge.

JP 2008-120415A is an example of related art.

However, in the wire harness 30 disclosed in JP 2008-120415A, the adhesive strength of the half-overlap wrapped portion is small due to having the protrusions and recessions 31, and therefore this wire harness is not suitable as a wire harness that has a usage condition in which the binding tape-type protection portion 33 is routed so as to have a large curve. Specifically, there has been a problem in which when the wire harness 30 is routed so as to have a large curve, the adhesive surfaces of the half-overlap wrapped portion of the binding tape member 32 constituting the binding tape-type protection portion 33 become peeled away, and the halves of the binding tape member 32 that were vertically overlapped become shifted in mutually opposite directions at the peeled locations, thus forming a gap and largely exposing the group of lead wires 34 through the gap.

Figure 5B:
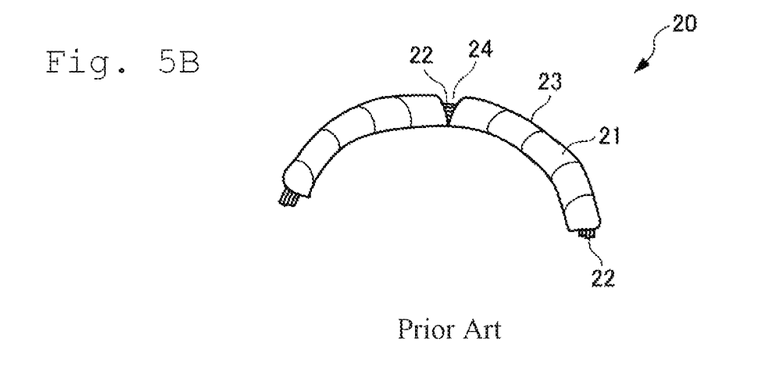
FIG. 5B is a front view of a gap formed when the conventional wire harness is routed with a curve.

Furthermore, in the above-described wire harness 20 shown in FIG. 5A, the use of the flat band-shaped binding tape member 21 makes it possible to ensure a relatively higher adhesive strength in the half-overlap wrapped portion compared to the wire harness 30 that is shown in FIG. 6 and disclosed in JP 2008-120415A. However, in this case as well, as shown in FIG. 5B, if the wire harness is routed so as to have a large curve, the adhesive surfaces of the half-overlap wrapped portion of the binding tape member 22 constituting the binding tape-type protection portion 23 become peeled away, thus forming a gap 24 and largely exposing the group of lead wires 22.

The present invention was achieved in order to solve the problems described above, and an object thereof is to provide a wire harness in which the binding tape-type protection portion can sufficiently protect the group of lead wires in the case where the wire harness interferes with a burr or an edge located along the wiring path for the wire harness, and that does not have the risk of the binding tape-type protection portion largely exposing the group of lead wires even if the wire harness is routed so as to curve a large amount.

SUMMARY OF THE INVENTION

In order to achieve the above object, a wire harness according to the present invention includes: a group of lead wires; and a binding tape-type protection portion that covers the group of lead wires, wherein the binding tape-type protection portion is formed by an overlap. The overlap formed by wrapping a binding tape member around the group of lead wires, the binding tape member being constituted by a tape member body that is made of a synthetic resin and is molded such that a cross-sectional shape orthogonal to a lengthwise direction is a triangular wave shape including two or more triangles, and an adhesive layer formed on one surface of the tape member body, and the adhesive layer is formed on an inner surface side of at least a half of the tape member body that is layered on a top side in the overlap wrapping.

According to this configuration, with the wire harness according to the present invention, in the case where the binding tape-type protection portion is routed so as to have a large curve, due to the resiliency of the triangular wave shape of the binding tape member, tensile force and compression force generated in the binding tape-type protection portion along the lengthwise direction changes the peak height in the triangular wave shape of the binding tape member so as to cause the tape width to change in the increasing direction, thus significantly reducing shearing force acting along the adhesive layer in the overlap wrapping overlaid portions.

For this reason, with the wire harness according to the present invention, in the case where the binding tape-type protection portion is routed so as to curve a large amount, distortion caused by the curving of the binding tape-type protection portion on the outer peripheral side in the curving plane of the binding tape-type protection portion is absorbed by reducing the peak height in the triangular wave shape of the binding tape member, thus making it possible to avoid the risk of the group of lead wires becoming exposed due to peeling of the adhesive layers in the overlap wrapping overlaid portions.

Also, in the wire harness according to the present invention, the binding tape-type protection portion has a large thickness and forms a cushion, and therefore the binding tape-type protection portion has a function of protecting the group of lead wires in the case of interfering with a bur or an edge located along the wiring path during routing.

In the wire harness according to the present invention, it is preferable that the adhesive layer is formed over the entire width of an inner surface side of the tape member body.

According to this configuration, with the wire harness according to the present invention, the portion of the adhesive layer that corresponds to the remaining half of the tape member body that is layered on the top side relative to the tape member body on the bottom side is adhered to the group of lead wires, and therefore little shifting occurs between the group of lead wires and the binding tape-type protection portion, and the portion of the group of lead wires that requires protection is favorably protected by the binding tape-type protection portion.

In the wire harness according to the present invention, it is preferable that the binding tape member may be colored with different colors. For instance, a color of the tape member body may be different from a color of an inclined surface that is demarcated by a width-direction central portion on a side opposite to the adhesive layer of the tape member body and that is hidden by a half of the tape member body that is layered on a top side in the overlap wrapping.

According to this configuration, with the wire harness according to the present invention, the half-overlap wrapping operation can be performed more reliably and faster than in conventional technology.

In the wire harness according to the present invention, it is preferable that the triangular wave shape that is the cross-sectional shape of the tape member body is configured such that an inclined surface on a side in a direction of being layered on a bottom side in the overlap wrapping is formed with a larger inclination angle than an inclined surface on a side in a direction of being layered on the top side.

According to this configuration, the triangular wave shape has a steep angle on the side that is layered on the bottom side, and therefore it is possible to identify the way to hold the tape member body and the wrapping direction in the overlap wrapping operation, the triangular wave shape has a large height, and efficiency in the overlap wrapping operation is enhanced.

According to the present invention, it is possible to provide a wire harness in which the binding tape-type protection portion can sufficiently protect the group of lead wires in the case where the wire harness interferes with a burr or an edge located along the wiring path for the wire harness, and that does not have the risk of the binding tape-type protection portion largely exposing the group of lead wires even if the wire harness is routed so as to curve a large amount.

DETAILED DESCRIPTION OF THE PREFERRED EMBODIMENTS

An embodiment of the present invention will be described below with reference to the drawings.

First, the configuration of a wire harness 1 will be described.

Figure 1:
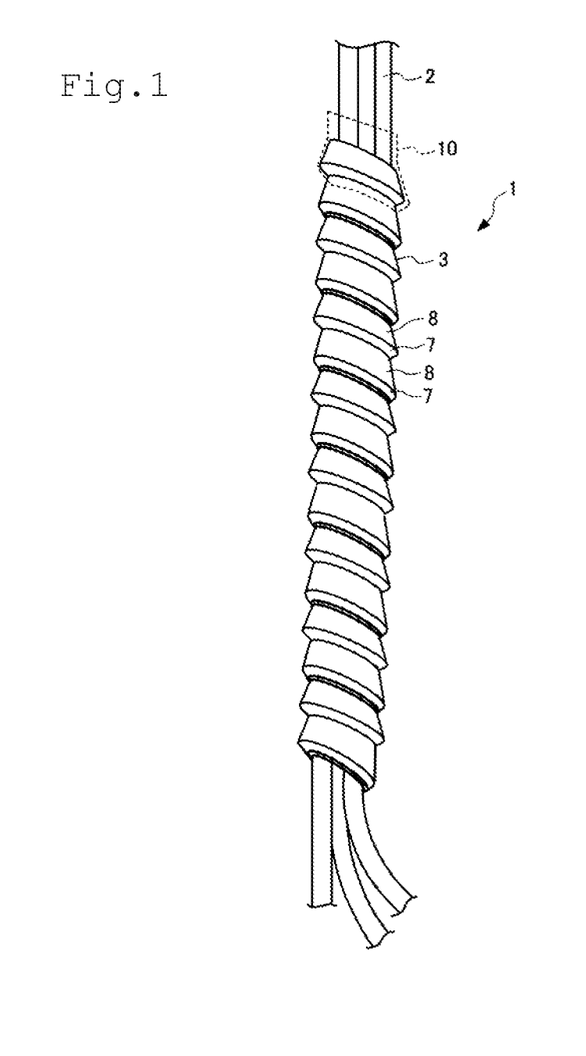
FIG. 1 is a front view of a wire harness according to an embodiment of the present invention.

As shown in FIG. 1, the wire harness 1 of the present embodiment has a group of lead wires 2 and a binding tape-type protection portion 3 that covers the group of lead wires 2. The wire harness 1 of the present embodiment is suitable as a wire harness that is routed in a vehicle.

The group of lead wires 2 is shown here as a bundle of sheathed electrical lines, but may be a bundle that includes multiple sheathed electrical lines and one bare electrical line. Furthermore, the group of lead wires 2 may be a shielded electrical line.

Figure 2A:
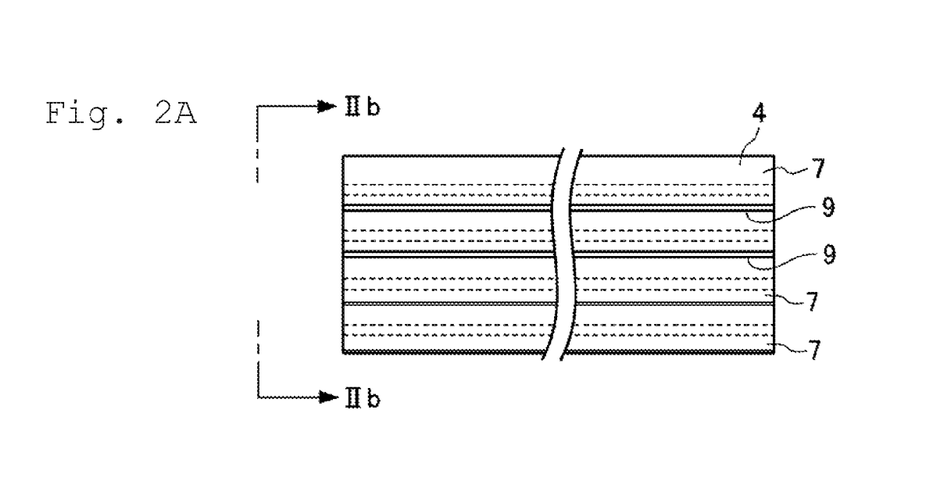
FIG. 2A is a front view of a binding tape member according to an embodiment of the present invention.
Figure 2B:
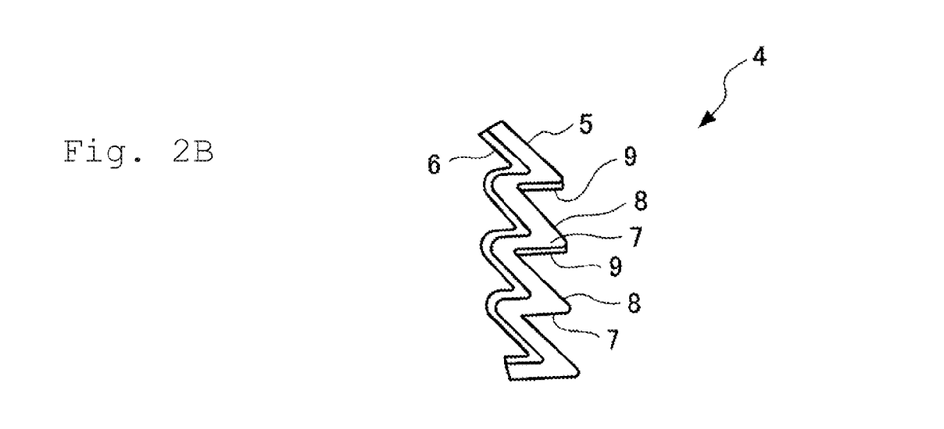
FIG. 2B is a cross-sectional view of FIG. 2A taken along IIb-IIb.

A binding tape member 4 shown in FIGS. 2A and 2B is molded such that the cross-sectional shape orthogonal to the lengthwise direction is a four-triangle wave shape, and half of a triangle wave shape overlaps the other half as the binding tape member 4 is wrapped around the group of lead wires 2 to constitute the binding tape-type protection portion 3 that resembles a double-threaded triangular screw as shown in FIG. 1. The binding tape member 4 has a tape member body 5 that is made of a synthetic resin and is molded such that the cross-sectional shape orthogonal to the lengthwise direction is a four-triangle wave shape, and an adhesive layer 6 formed on one surface of the tape member body 5.

The tape member body 5 is molded using a resin selected from among polypropylene, nylon, polyethylene, polyimide, amide-imide, ester imide, epoxy, and urethane.

The tape member body 5 is molded such that the cross-sectional shape orthogonal to the lengthwise direction is a four-triangle wave shape, by performing extrusion molding using an extruder that has an extrusion opening portion with a four-triangle wave shape in the resin extrusion portion, for example, and then the tape member body 5 is cut with constant dimensions.

The tape member body 5 has a thickness of 0.2 to 0.5 mm, a width of 19 to 40 mm, and a length of 0.4 to 1 m, for example, but these dimensions are determined as necessary in consideration of user-convenience, speed, covering length, and the like.

In the four-triangle wave shape of the tape member body 5, which is the cross-sectional shape orthogonal to the lengthwise direction, the triangular peaks of the tape member body 5 are each formed by a short inclined surface 7 having a steep inclination angle and a long inclined surface 8 having a gentle inclination angle. The four peaks are continuous with each other in a saw-tooth shape, and the short inclined surfaces 7 having a steep inclination angle are positioned on the rearward side in the half-overlap wrapping progression direction. Due to the cross-sectional shape orthogonal to the lengthwise direction being a four-triangle wave shape, the tape member body 5 has cushioning ability with respect to external pressure in the planar direction, and also has resiliency according to which: when tensile force is applied in the width direction, it undergoes change in which the peak height decreases and the apex angle and planar width increase, when compression force is applied in the width direction, it undergoes change in which the peak height increases and the apex angle and planar width decrease, and when the tensile force or compression force disappears, it returns to its original shape. The cushioning ability and resiliency are enhanced if the apex angle of the peaks is set to around 80 to 100°.

In particular, if the triangular peaks of the tape member body 5 are formed by the short inclined surfaces 7 having a steep inclination angle and the long inclined surfaces 8 having a gentle inclination angle, it is possible to set a large peak height with a small area, which leads to the conservation of material.

The adhesive layer 6 is formed over the entire width of one surface (the inner surface side) of the tape member body 5, and release paper is affixed to the adhesive layer 6 before being wrapped around the group of lead wires 2. There are no particular limitations on the type of adhesive. The adhesive layer 6 may be constituted by affixing double-sided adhesive tape to the tape member body 5.

In the case of the configuration in which release paper is affixed to the adhesive layer 6 before being wrapped around the group of lead wires 2, the release paper is peeled off while the tape member body 5 is wrapped around the group of lead wires 2.

As shown in FIG. 2B, in the four-triangle wave shape of the binding tape member 4, which is the cross-sectional shape orthogonal to the lengthwise direction, the short inclined surfaces 7 having a steep inclination angle of two peaks may be colored 9 with a color that can be recognized as different from a color of the tape member body 5, such as white. The half of the binding tape member 4 that has the two peaks provided with the white coloring 9 is the half that is layered on the bottom said in half-overlap wrapping. Providing the coloring 9 on the inclined surfaces 7 having a steep inclination angle of the two peaks increases recognition of the halves of the tape member body 5. Out of the two colorings 9, the coloring 9 toward the center in the width direction serves as a marker for the boundary when performing half-overlap wrapping.

Next, a method for manufacturing the wire harness 1 having the above configuration will be briefly described.

Figure 3:
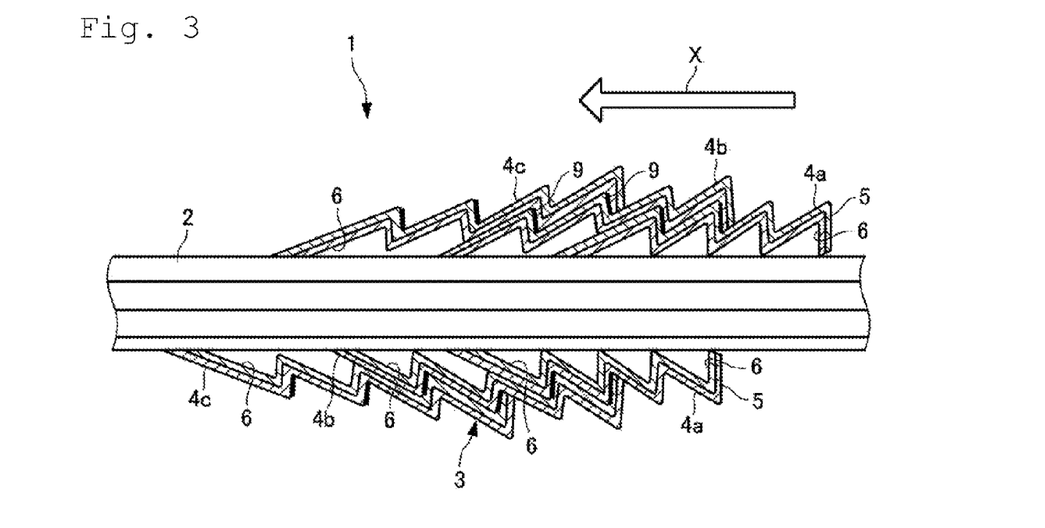
FIG. 3 is a process diagram showing a wire harness manufacturing method according to an embodiment of the present invention.
Figure 4:
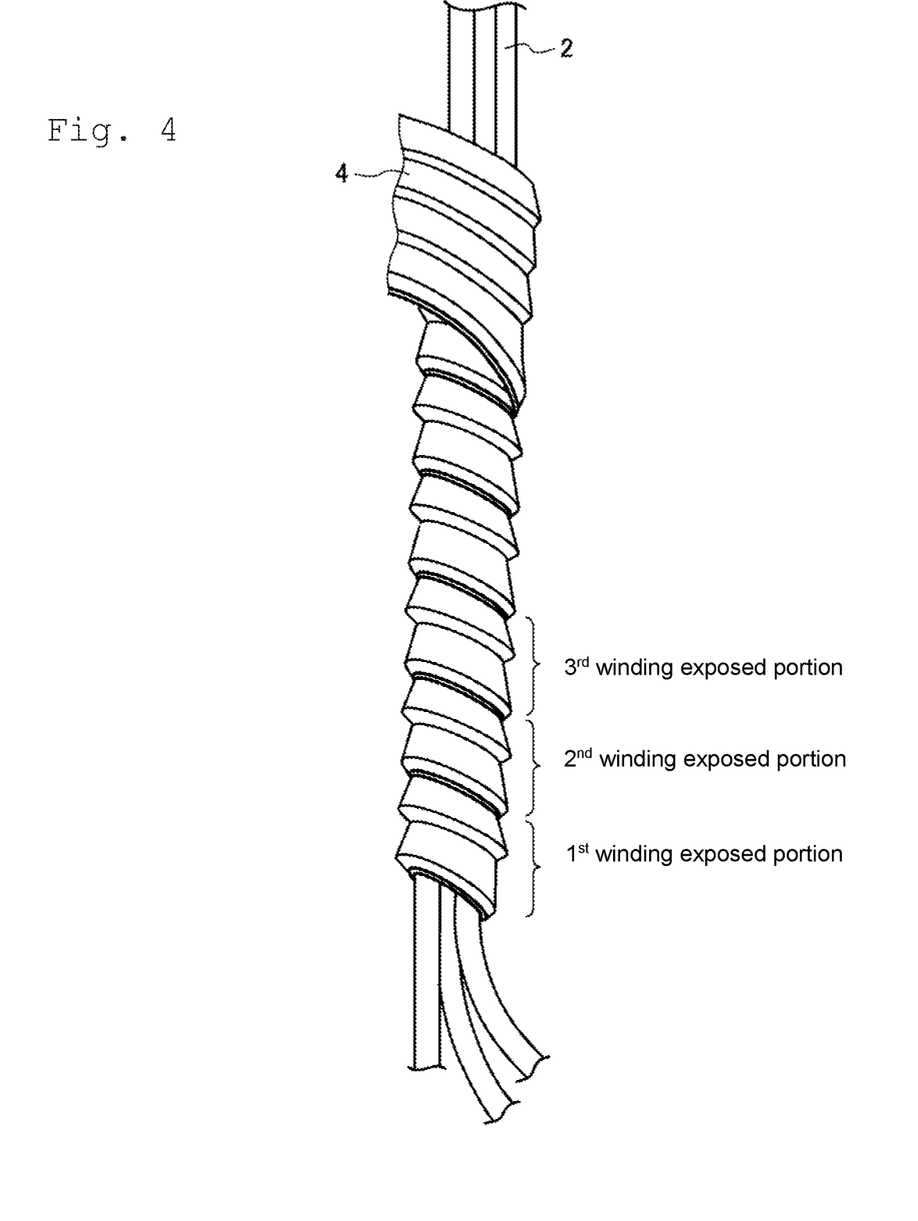
FIG. 4 is another process diagram showing the wire harness manufacturing method according to an embodiment of the present invention.

As shown in FIGS. 3 and 4, the group of lead wires 2 and the binding tape member 4 are prepared, the binding tape-type protection portion 3 that covers the group of lead wires 2 is formed by half-overlap wrapping (spiral wrapping) the binding tape member 4 around the group of lead wires 2 in the arrow X direction, and then the winding end portion of the binding tape-type protection portion 3 is affixed to the group of lead wires 2 using other adhesive tape 10, thus completing the manufacturing of the wire harness 1.

In FIG. 3, reference signs 4a, 4b, and 4c indicate the first, second, and third windings of the binding tape member 4 that is half-overlap wrapped around the group of lead wires 2. In the half-overlap wrapping operation, the binding tape member 4 is normally wrapped rightward around the group of lead wires 2, but regardless of whether rightward wrapping or leftward wrapped is performed, it is wrapped such that the tape half with the two colorings 9 is placed on the forward side in the wrapping progression direction.

In the half-overlap wrapped portion of the binding tape member 4, the two peaks in the tape half layered on the bottom side in the first winding serve as guides, the two peaks in the tape half layered on the top side in the second winding are wrapped thereon, and the adhesive layer 6 located on the tape half layered on the top side in the second winding is affixed by being layered on the two peaks in the tape half layered on the bottom side in the first winding, and half-overlap wrapping (spiral wrapping) is performed continuously in this manner. As shown in FIG. 4, two peaks are exposed in each of a first winding exposed portion, a second winding exposed portion, and a third winding exposed portion, and these two peaks are shaped as a double spiral.

The adhesive layer 6 is provided over the entire width of one surface of the tape member body 5, and the remaining half of the adhesive layer 6 that does not contribute to the adhesion of the tape halves in half-overlap wrapping opposes the group of lead wires 2 as peaks and adheres thereto by point contact or linear contact. The binding tape member 4 and the group of lead wires 2 are fixed by adhesion in this way, but the adhesion is easily released if shearing force is applied. Accordingly, adhesion is performed such that when the wire harness 1 is curved, positional shift easily occurs between the binding tape member 4 and the group of lead wires 2.

Next, actions and effects of the wire harness 1 having the above configuration will be described.

According to the wire harness 1 of the present embodiment, in the case where the binding tape-type protection portion 3 is routed so as to have a large curve, due to the resiliency of the triangular wave shape of the binding tape member, when tensile force is generated on the outer peripheral side in the curving plane of the binding tape-type protection portion 3, the binding tape member 4 extends such that the peak height in the triangular wave shape of the binding tape member 4 on the outer peripheral side decreases, and the tensile force acting on the half-overlap wrapping overlaid portion decreases, thus eliminating the risk of peeling of the adhesive layers in the half-overlap wrapping overlaid portion.

Also, when compression force is generated on the inner peripheral side in the curving pane of the binding tape-type protection portion 3, the binding tape member 4 shrinks such that the peak height in the triangular wave shape of the binding tape member 4 on the inner peripheral side increases, and the compression force having a shearing effect on the adhesive layer 6 in the half-overlap wrapping overlaid portion decreases, thus eliminating the risk of peeling of the adhesive layers on the overlaid surfaces of the halves of the binding tape member 4.

Specifically, in the wire harness 1 of the present embodiment, the curving of the binding tape-type protection portion 3 causes distortion to occur between the outer peripheral side and the inner peripheral side in the curving plane of the binding tape-type protection portion 3, and this distortion is absorbed as change in the peak height in the triangular wave shape of the binding tape member 4.

In the wire harness 1 of the present embodiment, due to the triangular wave shape of the binding tape member 4, distance is maintained between the outer surface of the binding tape-type protection portion 3 and the group of lead wires 2, and the binding tape-type protection portion 3 has cushioning ability and resiliency. Accordingly, if the wire harness 1 interferes with a bur or edge located along the wiring path for the wire harness, the binding tape-type protection portion can sufficiently protect the group of lead wires, and even in the case of being routed so as to curve a large amount, there is no risk of the binding tape-type protection portion largely exposing the group of lead wires.

In the wire harness 1 of the present embodiment, the adhesive layer 6 is formed over the entire width of the inner surface side of the tape member body 5, and therefore positional shift does not occur between the group of lead wires 2 and the binding tape-type protection portion 3.

In the wire harness 1 of the present embodiment, the triangular peaks of the tape member body 5 are formed by the short inclined surfaces 7 having a steep inclination angle and the long inclined surfaces 8 having a gentle inclination angle, and the short inclined surfaces 7 having a steep inclination angle are located on the rearward side in the half-overlap wrapping progression direction. Accordingly, in the half-overlap wrapping operation, the half of the tape member body 5 that is layered on the top side is favorably caught on the half of the tape member body 5 that is layered on the bottom side, thus making it possible to tightly overlay the two halves, and enhancing efficiency in the half-overlap wrapping operation.

In the wire harness 1 of the present embodiment, the colorings 9 are provided on short inclined surfaces 7 having a steep inclination angle, thus making it possible to perform spiral wrapping such that the half of the tape member body 5 that is layered on the top side is layered on the half of the tape member body 5 that is layered on the bottom side while watching the colorings become hidden. Also, due to peaks being formed in the cross-sectional shape, the half-overlap wrapping operation can be performed more reliably and faster than in conventional technology.

The present invention is not limited to the embodiment described above, and the technical scope of the present invention described in the claims encompasses aspects modified in design in various ways without departing from the gist of the invention.

The above embodiment describes an example in which the tape member body is formed with a four-triangle wave shape and is half-overlap wrapped, but it may be ¼ overlap wrapped or ¾ overlap wrapped. Further, in the present invention, it is sufficient that there are two or more triangles in the triangular wave shape.

Regarding the tape member body, the technical scope of the present invention also encompasses the case where the inclination directions are reversed and the two inclined surfaces forming the peaks have the same dimensions in the inclination directions, and the case where the peak apex angles are outside the range of 80 to 100°.

Although the above embodiment describes the case where the tape member body is molded with the four-triangle wave shape by extrusion molding, molding may be performed using another method. Specifically, a configuration is possible in which double-sided tape is affixed to one surface of a flat band-shaped tape member body, release paper is further affixed to the double-sided tape, and the resulting stacked member is subjected to hot-press molding.

Although the above embodiment describes an example of forming the adhesive layer over the entire width of one surface of the tape member body, the technical scope also encompasses the case where the adhesive layer is formed on at least the overlaid surface of the half of the tape member body that is layered on the top side in half-overlap wrapping. In this case, the binding tape-type protection portion and the group of lead wires are not adhered to each other by the adhesive layer, and therefore the binding tape-type protection portion and the group of lead wires are fixed by using other adhesive tape to adhere the end portion of the binding tape-type protection portion to the group of lead wires. Even if the wire harness curves a large amount, a gap is not formed in the binding tape-type protection portion, and the group of lead wires is not largely exposed.

As described above, the present invention has effects such as that if the wire harness interferes with a bur or edge located along the wiring path for the wire harness, the binding tape-type protection portion can sufficiently protect the group of lead wires, and even in the case of being routed so as to curve a large amount, there is no risk of the binding tape-type protection portion largely exposing the group of lead wires. The present invention is useful to general wire harnesses that are routed in vehicles.

The invention claimed is:

1. A wire harness comprising:
   a group of lead wires; and
   a binding tape-type protection portion that covers the group of lead wires,
   wherein the binding tape-type protection portion is formed by overlap wrapping a binding tape member around the group of lead wires, the binding tape member being constituted by a tape member body that is made of a synthetic resin and is molded such that a cross-sectional shape orthogonal to a lengthwise direction is a triangular wave shape including two or more triangles, and an adhesive layer formed on one surface of the tape member body.

2. The wire harness according to claim 1, wherein the adhesive layer is formed over the entire width of an inner surface side of the tape member body.

3. The wire harness according to claim 1, wherein a color of the tape member body is different than a color provided on an inclined surface that is demarcated by a width-direction central portion on a side opposite to the adhesive layer of the tape member body and that is hidden by a half of the tape member body that is layered on a top side in the overlap wrapping.

4. The wire harness according to claim 1, wherein a peak forming the triangular wave shape that is the cross-sectional shape of the tape member body is formed by a short inclined surface having a steep inclination angle and a long inclined surface having a gentle inclination angle, and the short inclined surface having a steep inclination angle is located on a rearward side in an overlap wrapping progression direction.

5. The wire harness according to claim 2, wherein a color of the tape member body is different than a color provided on an inclined surface that is demarcated by a width-direction central portion on a side opposite to the adhesive layer of the tape member body and that is hidden by a half of the tape member body that is layered on a top side in the overlap wrapping.

6. The wire harness according to claim 2 wherein a peak forming the triangular wave shape that is the cross-sectional shape of the tape member body is formed by a short inclined surface having a steep inclination angle and a long inclined surface having a gentle inclination angle, and the short inclined surface having a steep inclination angle is located on a rearward side in an overlap wrapping progression direction.

7. The wire harness according to claim 3, wherein a peak forming the triangular wave shape that is the cross-sectional shape of the tape member body is formed by a short inclined surface having a steep inclination angle and a long inclined surface having a gentle inclination angle, and the short inclined surface having a steep inclination angle is located on a rearward side in an overlap wrapping progression direction.

* * * * *